Dec. 27, 1955        G. C. WHEELER        2,728,224
TESTER FOR PAPER SURFACES OR THE LIKE
Filed March 27, 1952
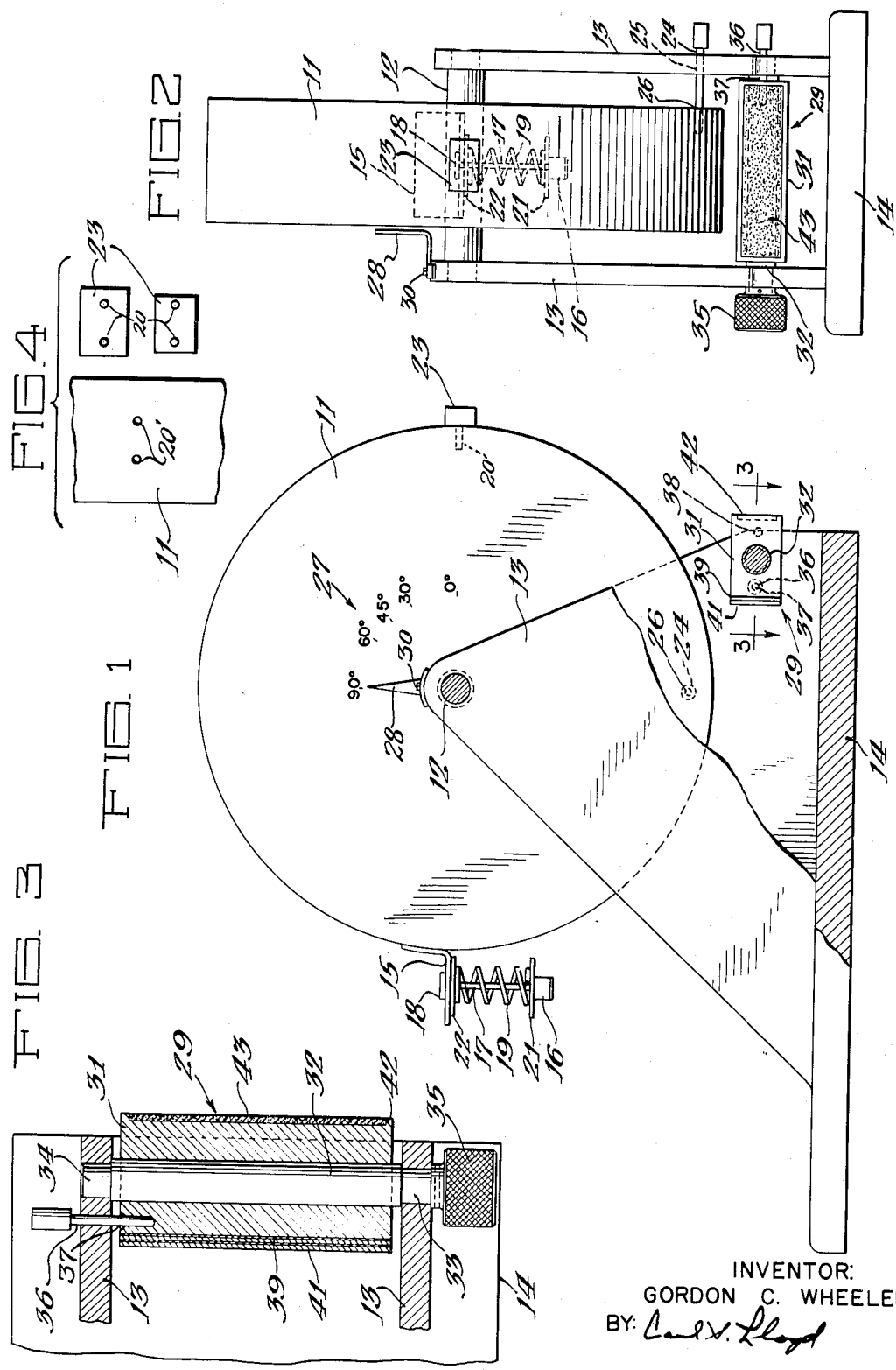
INVENTOR:
GORDON C. WHEELER
BY:
ATTORNEY:

United States Patent Office 2,728,224
Patented Dec. 27, 1955

2,728,224

TESTER FOR PAPER SURFACES OR THE LIKE

Gordon C. Wheeler, Chicago, Ill., assignor to Lithographic Technical Foundation, Chicago, Ill., a corporation of Delaware Application March 27, 1952, Serial No. 278,937

8 Claims. (Cl. 73—150)

This invention has to do with the problem of testing the strength of paper or like materials and a particular aspect thereof is the provision of a device for determining the capacity of a paper sheet to resist the tendency of the surface portion thereof during printing thereon to adhere to the printing surface (which may be either a blanket or a plate) due to the viscous nature of the ink, which often causes picking or splitting of the sheet.

Various attempts have been made in the past to provide a practicable device for measuring this "pick" or bond strength of paper, but, for one reason or another, none of them has been as successful or as well suited to favorable testing conditions as is to be desired. For example, effort has been made to measure the strength in tension through the thickness of the sheet by cementing the sheet between two blocks and measuring the force required to separate the blocks. This kind of test has proved unsatisfactory, primarily because the penetration of the cement tends to change the nature of the paper and non-uniform paper thickness tends to cause great variations in local stresses resulting in premature or erratic failure. Also this test does not accurately determine the visco-elastic properties of paper because it does not involve a rate of loading (i. e. of stress application) of anything like the same order of magnitude as that experienced during printing. It is very difficult to measure the forces involved when the rate of loading is of that order and the test referred to fails to solve that problem.

Another type of test which has been tried is the use of waxes having varying adhesive properties. In this test the wax is melted and pressed onto the paper surface. After cooling it is removed by a perpendicular pull, the intent being that either the wax would separate from the paper or the paper would be picked or split, thus grading the paper as to pick strength. For reasons perhaps not fully understood, this test has been found to give results which are not in accord with printing experience, particularly when papers having coatings bonded with latex-bearing adhesives, or papers of varying thicknesses, have been tested thereby.

Other testing methods and equipment have been devised which have sought to simulate the picking action which actually takes place on a printing press. These methods have involved simulated press elements consisting of either a pair of cylinders or a flatbed-cylinder combination. In them either a standard viscous liquid or ink has been applied to the paper sample at different speeds (or at accelerating speed), or a series of liquids or inks of increasing viscosity have been used and the speed of application to the paper kept constant. While such testing methods and apparatus are used, they have not been found entirely practicable because of the difficulty of maintaining proper pressures, velocities and mechanical relationships; also the cost of such apparatus is excessive.

In seeking a solution of the problem, it has been borne in mind that the paper during printing goes through (1) compression to a maximum pressure followed by release of compression (this cycle requiring a definite period of time determined by press speed and deformation of the parts and material involved) and (2) separation of the printing surface and paper by means of ink film rupture. When paper failure takes place, it occurs during the separation process, the severity of which depends on the rheological (i. e. flow) properties of the ink, the pressures used, and the press speed. The rheological properties of the ink film may change during the period of compression and release by working and by absorption of ink components into the paper. Also, the properties of the surface of the paper may be changed by this treatment. A good test should therefore closely simulate press pressures, periods of contact, and velocities of separation; and it should also use viscous liquids having the same effects on the paper, and affected the same way by the paper, as the inks used for printing.

One way to accomplish this would be to use an instrument similar to a printing press. This would involve press size rollers in order to obtain long enough periods of contact along with the required separation velocities. Also, on printing press, reproducible control of these variables depends to a large degree on the operator's skill. This method would therefore not only be very costly, but would require the services of skilled operators who are often (in fact usually) not available where the testing is to be done.

The device proposed by the present invention employs a pendulum type mechanism to obtain the desired impact and separation velocities, and spring or other resilient means for receiving and then returning the kinetic energy of the pendulum to give desired periods of contact and desired pressures. To obtain low enough impact and separation velocities, an unconventional pendulum is preferably used, in which the ratio of the inertia mass to the driving mass is made large by using two weights, one distributed equally on both sides of the axis and the other off the axis. The equally distributed weight can take various forms, as, for example, a disc or flywheel, as shown, or equal weights at opposite ends of a pivoted member by which they may be carried.

The principal object of the invention is to provide a paper surface tester of this type which is easy to operate, is relatively inexpensive, and obtains accurate and reliable results without requiring the services of particularly skilled operators.

Other objects and advantages will be evident from the following description, taken in connection with the accompanying drawings, illustrating a preferred embodiment thereof, in which:

Fig. 1 is a side elevational view, partially broken away, of a paper testing device embodying the invention;

Fig. 2 is an end elevational view thereof;

Fig. 3 is a sectional view taken on the section line 3—3 of Fig. 1; and

Fig. 4 is a fragmentary view of variable counterweights which are, or may be, used in the device, and the means for applying them.

Referring more specifically to the drawings, which are to be understood as being for illustrative purposes only, the reference numeral 11 indicates a pendulum member in the form of a flywheel rotatably mounted on a shaft 12 bearinged in upright brackets 13 arising from a base plate 14.

A bracket 15 is secured to the periphery of the wheel 11 and carries a hammer comprising a head 16, a rod or shank 17 extending through an aperture in the bracket 15, and a stop member 18 on the end of the shank opposite that on which the head 16 is carried. A spring 19 is positioned on the shank 17 and its ends bear upon washers 21 and 22, respectively, the former being immediately above the hammer head 16 and the latter beneath a horizontal portion of the bracket 15.

A counterweight 23 is positioned on the periphery of the wheel 11 opposite the location of the hammer assembly just described and may be readily replaceable whereby the weight may be varied as desired for particular tests. In Fig. 4 I have shown two of the counterweights 23 of different size having prongs 20 thereon adapted to be received in holes 20' in the periphery of the wheel 11. When it is desired to change the weight of the load on the wheel the counterweight member 23 which happens to be in place on the wheel may be removed and another such member of different size, substituted therefor. The weight of the member 23 in any case will be less than the weight of the hammer 16 and related elements, thus creating a condition of unbalance of the flywheel 11.

A pin 24 is, or may be, provided to hold the flywheel in its initial position shown in Fig. 1. Such pin passes through a hole 25 in one of the uprights 13 and into a hole 26 in a side face of the wheel.

A scale 27 may be provided on one side of the wheel, graduated in degrees, and a pointer 28 may be positioned on the top of one of the uprights 13, to which, as shown, it is secured by a screw 30, to indicate the starting angle of the pendulum and the energy absorbed in the impression.

A specimen-holder, generally indicated at 29, is supported by the brackets 13 beneath the wheel 11 and at one side of the axis of the latter. The holder comprises a block 31 fixedly mounted on a shaft 32 which has bearing portions 33 and 34 journaled in bearings in the brackets 13. A knurled head or thumbpiece 35 is provided on the shaft 32, whereby the block 31 may be turned from one position to another for a purpose to be presently described. An indexing pin 36 is provided to hold the block in either of its positions, such pin being adapted to pass through a hole in one of the brackets 13 and to enter either a hole 37 or a hole 38 in the block 31, depending on the position of the latter.

On one side of the block 31 a two-sided pressure sensitive tape 39 is placed, and a specimen or sample 41 of the paper to be tested may be adhesively held to the outer side of this tape.

A well 42 is provided on the opposite face of the block 31 and is adapted to contain ink, which is indicated by the numeral 43 in Figs. 2 and 3.

The operation of the device is as follows:

A uniform film of ink of known characteristics is deposited in the well 42 on the side of the specimen-holder opposite to the side on which the specimen has been or is to be placed. The ink can be applied in such a uniform film with a roller, or by drawing a flat bar over the well after an excess of ink has been applied to it. The holder is then indexed 180°. To transfer the ink to the hammer 16, the pendulum is allowed to swing through the desired distance for the number of impacts required for good ink transfer.

The specimen is attached to the holder block 31 by means of two-sided pressure sensitive tape 39, as stated above. The holder is then again indexed 180° and the pendulum allowed to swing through the distance necessary to give the required velocity. It is raised to a selected position and released, whereupon it falls by its own weight and causes the inked hammer 16 to strike the paper specimen on the anvil or holder 31. It is caught on rebound to prevent a double impression. To vary the severity of the tests, fluids of various tackinesses or various impact velocities are used. The specimen either fails or survives a given set of conditions.

The components of the instrument above described can be so dimensioned as to give the same pressures, period of contact, and impact and separation velocities as are experienced on any particular printing press. The hammer-face can be covered with a piece of offset blanket to simulate offset press operations if desired. Also the hammer face can be either curved or flat, as can the specimen-holder and, as above noted, the latter can be turned on its axis for easy inking on one side, followed by a transfer of the ink to the hammer by impact, and then, reversed for positioning the specimen. The indexing pin holds it firmly in either position.

The velocity of the separation of the hammer from the anvil is determined by the rebound angle, the moment of inertia and the unbalance of the flywheel 11. The period of contact between the hammer and the specimen on the holder or anvil 31 is determined by the starting angle of the hammer when the flywheel is released, the moment of inertia and unbalance of the flywheel and also by the stiffness or preloading of the spring 19. The pressure of the hammer on the specimen is determined by the preloading of the spring 19 and the unbalance of the flywheel or swingable member 11. These characteristics are inherent in the structure above described and it will be evident that they may be varied in accordance with the weight or weights 23 that are used, the stiffness or compression on the spring 19, the dimensions and design of the apparatus and by the starting position at which the member 11 is released for a particular test.

It has been found in a large number of tests that this instrument has the ability to predict press performance very accurately and thus to determine with great accuracy whether a particular type or grade of paper will withstand the conditions to which it is subjected when printed upon by a particular press or type of press.

In addition to testing paper for purposes above set forth the device of my invention is useful for testing the viscoelastic properties of tacky materials such as paints, pressure-sensitive adhesives, and other products.

The foregoing description has been given for clearness of understanding only, and no unnecessary limitations should be inferred therefrom, for it will be apparent that various changes may be made in the form and construction of embodiments of the invention without departing from the spirit and scope thereof.

I claim:

1. A device for testing paper surfaces or the like, comprising a specimen-holder; an unbalanced swingable member mounted adjacent said holder; a hammer carried by said member and having an ink-carrying surface arranged to strike and compress a specimen on said holder upon swinging of said member in one direction, and to separate therefrom upon swinging of said member in the other direction upon rebound; and resilient means providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions.

2. A device for testing paper surfaces or the like, comprising a specimen-holder; an unbalanced swingable member mounted adjacent said holder; a hammer carried by said member and having an ink-carrying surface arranged to strike and compress a specimen on said holder upon swinging of said member in one direction, and to separate therefrom upon swinging of said member in the other direction upon rebound; resilient means providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions; said holder having a specimen-carrying face and an ink-carrying face and being arrangeable in position to present said ink-carrying face to the hammer and thereafter in position to present said specimen-carrying face to hammer; and means for securing said holder in either of said positions.

3. A device for testing paper surfaces or the like, comprising a specimen-holder; a flywheel mounted adjacent said holder and having its weight equally distributed about the axis thereof; a hammer carried by said flywheel on the periphery thereof and having an ink-carrying surface arranged to strike and compress a specimen on said holder upon swinging of the flywheel in one direction, and to separate therefrom upon swinging of the flywheel in the other direction upon rebound, the weight of said hammer being off the axis of said flywheel and promoting the swinging of the flywheel to unbalance the same in the manner of a pendulum; and resilient means providing a yielding back for said hammer for receiving and storing kinetic energy from the flywheel upon swinging of the latter in said first direction, and for then returning such energy at the start of the swinging of the flywheel in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions.

4. A device for testing paper surfaces or the like, comprising a specimen-holder; a flywheel mounted adjacent said holder and having its weight equally distributed about the axis thereof, a hammer carried by said flywheel on the periphery thereof and having an ink-carrying surface arranged to strike and compress a specimen on said holder upon swinging of the flywheel in one direction, and to separate therefrom upon swinging of the flywheel in the other direction upon rebound, the weight of said hammer being off the axis of said flywheel and promoting the swinging of the flywheel in the manner of a pendulum; a replaceable counterweight of selected mass on the flywheel at a point opposed to the position of the hammer; and resilient means providing a yielding backing for said hammer for receiving and storing kinetic energy from the flywheel upon swinging of the latter in said first direction, and for then returning such energy at the start of the swinging of the flywheel in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions.

5. A device for testing paper surfaces or the like, comprising a specimen-holder; a swingable mechanism mounted adjacent said holder and including a member having its weight equally distributed about the axis thereof; a hammer carried by said member and having an ink-carrying surface arranged to strike and compress a specimen on said holder upon swinging of said member in one direction and to separate therefrom upon swinging of said member in the other direction upon rebound, the weight of said hammer being off the axis of said member to unbalance the latter; resilient means providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions.

6. A device for testing paper surfaces or the like, comprising a specimen-holder; a swingable member mounted adjacent said holder; a hammer carried by said member and having a face adapted to be inked and arranged to strike and compress a specimen on said holder upon swinging of said member in one direction, and to separate therefrom upon swinging of said member in the other direction upon rebound; a spring providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said spring, and the pressure exerted by said member upon such contact being determined by the unbalance of such member and the preloading of said spring, whereby a paper specimen on said holder may be subjected to varying tests by impact of said hammer thereon and separation of the same therefrom under variations of said conditions; and a mounting for said spring comprising a bracket on said swingable member having an aperture therein, a shank on the hammer extending through said aperture, the spring being positioned on said shank extending between the hammer head and said bracket, and a stop on the end of said shank opposite said head.

7. A device for testing paper surfaces or the like, comprising a specimen-holder; a swingable member mounted adjacent said holder; a hammer carried by said pendulum member and having an ink-carrying surface arranged to strike and compress a specimen on said holder upon swinging of said member in one direction, and to separate therefrom upon swinging of said member in the other direction upon rebound; a spring providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said spring, and the pressure exerted by said member upon such contact being determined by the unbalance of such member and the preloading of said spring, whereby a paper specimen on said holder may be subjected to varying tests by impact of said hammer thereon and separation of the same therefrom under variations of said conditions, and a mounting for said spring comprising a bracket on said swingable member having an aperture therein, a shank on the hammer extending through said aperture, the spring being positioned on said shank extending between the hammer head and said bracket, a stop on the end of said shank opposite the said head, and spacing means on said shank to vary the preloading of said spring.

8. A device for testing paper surfaces or the like, comprising a specimen-holder; a swingable member in the form of a wheel mounted adjacent said holder; a supporting bracket; a hammer carried by said member and having an ink-carrying surface arranged to strike and compress a specimen on said holder upon swinging of said member in one direction, and to separate therefrom upon swinging of said member in the other direction upon rebound; resilient means providing a yielding backing for said hammer for receiving and storing kinetic energy from said member upon swinging of the latter in said first direction, and for then returning such energy at the start of the swinging of said member in said second direction, the velocity of the separation of the hammer from the paper being determined by the rebound angle, the moment of inertia and the unbalance of said member, the period of contact of the hammer with the specimen being determined by the starting angle, the moment of inertia and the unbalance of said member and the preloading of said resilient means, and the pressure exerted by said member upon such contact being determined by the unbalance of such member and the preloading of said resilient means, whereby a paper specimen on said holder may be subjected to varying tests by impact of said hammer thereon and separation of the same therefrom under variations of said conditions; a scale on said swingable member for indicating the starting angle of the hammer and the energy absorbed by the impression; a pointer mounted adjacent said scale; and removable means for holding said swingable member in starting position relative to the bracket.

References Cited in the file of this patent

UNITED STATES PATENTS

| | | |
|---|---|---|
| 403,676 | Keep | May 21, 1889 |
| 1,423,841 | Elmendorf | July 25, 1922 |
| 1,939,814 | Hoch | Dec. 19, 1933 |
| 2,051,464 | Bradner et al. | Aug. 18, 1936 |
| 2,177,876 | Perrey | Oct. 31, 1939 |
| 2,388,246 | Berger | Nov. 6, 1945 |
| 2,518,350 | McCormick | Aug. 8, 1950 |